United States Patent
Silber et al.

(10) Patent No.: US 10,174,485 B2
(45) Date of Patent: Jan. 8, 2019

(54) SYSTEM AND METHOD FOR PROVIDING RECONFIGURABLE INPUT DEVICES FOR A WORK VEHICLE

(71) Applicant: CNH Industrial America, LLC, New Holland, PA (US)

(72) Inventors: Franz Josef Silber, Weiss (AU); Eran Salzman, Glenview, IL (US); Eric Holton, Burr Ridge, IL (US); Markus Putz, Sankt Peter in Der (AU)

(73) Assignee: CNH Industrial America LLC, New Holland, PA (US)

( * ) Notice: Subject to any disclaimer, the term of this patent is extended or adjusted under 35 U.S.C. 154(b) by 220 days.

(21) Appl. No.: 15/359,749

(22) Filed: Nov. 23, 2016

(65) Prior Publication Data
US 2018/0142446 A1 May 24, 2018

(51) Int. Cl.
| | |
|---|---|
| *B60K 37/06* | (2006.01) |
| *E02F 9/26* | (2006.01) |
| *F21V 23/04* | (2006.01) |
| *E02F 9/22* | (2006.01) |
| *F15B 13/044* | (2006.01) |

(Continued)

(52) U.S. Cl.
CPC ............... *E02F 9/26* (2013.01); *B60K 37/06* (2013.01); *E02F 9/2267* (2013.01); *F15B 13/044* (2013.01); *F21V 23/04* (2013.01); *F21Y 2113/13* (2016.08); *F21Y 2115/10* (2016.08); *G06F 3/04847* (2013.01); *G06F 3/04883* (2013.01)

(58) Field of Classification Search
CPC .......... E02F 9/26; E02F 9/2267; B60K 37/06; F15B 13/044; F21V 23/04; F21Y 2113/13; F21Y 2115/10; G06F 3/04847; G06F 3/04883
USPC .......................................................... 701/50
See application file for complete search history.

(56) References Cited

U.S. PATENT DOCUMENTS 4,853,767 A * 8/1989 Sakai ....................... H04N 1/64
358/530
6,542,789 B2 4/2003 Ufheil
(Continued)

FOREIGN PATENT DOCUMENTS

| | | |
|---|---|---|
| DE | 102016207568 | 11/2016 |
| EP | 2987672 | 2/2016 |
| WO | WO 9942327 | 8/1999 |

*Primary Examiner* — Gertrude Arthur Jeanglaude
(74) *Attorney, Agent, or Firm* — Rickard K. DeMille; Rebecca L. Henkel (57) ABSTRACT

A system for providing reconfigurable input devices for a work vehicle may generally include a plurality of input devices configured to receive operator inputs associated with controlling the operation of a plurality of components. Each input device may include a light source. In addition, the system may include a controller communicatively coupled to the input devices. The controller may be configured to store an input device assignment for each of the components that assigns each input device to a respective one of the components. The controller may also be configured to transmit a control signal to each input device that causes the light source of each input device to produce colored light, wherein a specific color of the colored light produced by the light source of each input device provides a visual indicator of the input device assignment for each of the components.

20 Claims, 7 Drawing Sheets

(51) Int. Cl.
    *G06F 3/0488*    (2013.01)
    *G06F 3/0484*    (2013.01)
    *F21Y 115/10*    (2016.01)
    *F21Y 113/13*    (2016.01)

(56) References Cited

U.S. PATENT DOCUMENTS

| | | |
|---|---|---|
| 7,032,703 B2 | 4/2006 | Wulfert et al. |
| 7,036,248 B2 | 5/2006 | Meyeres et al. |
| 7,441,404 B2 | 10/2008 | Devier et al. |
| 7,975,475 B2 | 7/2011 | Ramun |
| 8,146,704 B2 | 4/2012 | Ruhter et al. |
| 9,322,146 B2 | 4/2016 | Marquette et al. |
| 2003/0169431 A1* | 9/2003 | Moriuchi ............ G01J 1/42 356/601 |
| 2005/0246040 A1 | 11/2005 | Horkavi et al. |
| 2006/0158435 A1* | 7/2006 | Lin ............ G06F 3/0425 345/168 |
| 2014/0343697 A1 | 11/2014 | Kuipers |

\* cited by examiner

SYSTEM AND METHOD FOR PROVIDING RECONFIGURABLE INPUT DEVICES FOR A WORK VEHICLE

FIELD OF THE INVENTION

The present subject matter relates generally to work vehicles and, more particularly, to a system and method for providing reconfigurable input devices for a work vehicle that allows an operator to quickly and easily reassign an input device for controlling the operation of a desired component.

BACKGROUND OF THE INVENTION

Work vehicles, such as tractors, other agricultural vehicles, construction vehicles, and/or the like, typically include a cab containing a plurality of input devices, such as buttons, knobs, switches, etc., configured to allow the operator to provide operator inputs for controlling the operation of one or more on-board or auxiliary components of the work vehicle. The various input devices may be provided at numerous locations within the cab, such as on a control panel or dashboard, on the vehicle's steering wheel, on one or more control levers, joysticks multi-function handles, and/or the like.

Typically, the control functionality for each input device is determined by the manufacturer. As such, each input device is pre-assigned to a corresponding component so that operator inputs provided via the input device are used to control the operation of the pre-assigned component. Unfortunately, in many instances, the pre-assigned control functionality for a given input device may not be desirable in light of a particular operator's preferences and/or expectations.

Moreover, work vehicles typically include a hydraulic system having a plurality of electronically controlled valves configured to control the supply of hydraulic fluid to various on-board hydraulic components and/or various auxiliary hydraulic components, such as one or more hydraulic motors and/or actuators included within an implement being towed by the vehicle. To control the operation of such valves, a specific set of input devices, such as one or more individual paddle switches and/or a bank of paddle switches, is included within the cab. In such instance, similar to that described above, each paddle switch is typically pre-assigned to control the operation of a given valve of the hydraulic system. Thus, for current work vehicles, if an operator desires to change which hydraulic component is being controlled by a given paddle switch, the operator is required to physically rearrange the hydraulic connections of the hoses of the hydraulic system such that the hoses are connected in a hose sequence that maps to the desired paddle switch. Such a methodology is very time consuming and can be frustrating for the operator.

Accordingly, an improved system and method for providing reconfigurable input devices for a work vehicle that allows an operator to quickly and easily reassign an input device for controlling the operation of a desired component would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for providing reconfigurable input devices for a work vehicle. The system may generally include a plurality of input devices configured to receive operator inputs associated with controlling the operation of a plurality of components. Each input device may include a light source. In addition, the system may include a controller communicatively coupled to the input devices. The controller may be configured to store an input device assignment for each of the components that assigns each input device to a respective one of the components. The controller may also be configured to transmit a control signal to each input device that causes the light source of each input device to produce colored light, wherein a specific color of the colored light produced by the light source of each input device provides a visual indicator of the input device assignment for each of the components.

In another aspect, the present subject matter is directed to a system for providing reconfigurable input devices for controlling the operation of valves of a hydraulic system of a work vehicle. The system may generally include a plurality of electronically controlled valves and a plurality of input devices configured to receive operator inputs associated with controlling the operation of the valves. Each input device may include a light source. In addition, the system may include a controller communicatively coupled to the input devices and the valves. The controller may be configured to store an input device assignment for each of the valves that assigns each input device to a respective valve. The controller may also be configured to transmit a control signal to each input device that causes the light source of each input device to produce colored light, wherein a specific color of the colored light produced by the light source of each input device provides a visual indicator of the input device assignment for each of the valves.

In a further aspect, the present subject matter is directed to a method for providing reconfigurable input devices for a work vehicle, wherein the work vehicle includes a plurality of input devices configured to receive operator inputs associated with controlling the operation of a plurality of components. The method may include storing, with a computing device, a color assignment for each of the components that assigns each component to a different color and storing, with the computing device, an input device assignment for each of the components that assigns each of the input devices to a respective one of the components. In addition, the method may include controlling, with the computing device, the operation of a light source associated with each of the input devices so as to cause each light source to produce colored light in a specific color based on the color assignments so as to provide a visual indicator of the input device assignment for each of the components.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for providing reconfigurable input devices for a work vehicle. Specifically, in several embodiments, each input device may include a light source associated therewith that is configured to produce colored light in a plurality of different colors. As such, by assigning a specific color to each component configured to be controlled by one of the input devices, the light source of the input device associated with such component may be controlled so as to produce colored light that matches the specific color assigned to the component. Moreover, as will be described below, an operator may be allowed to adjust or change the control assignments defined for each controllable component, such as the color assignment for the component and/or the input device assignment for the component. Based on the operator-selected assignments, a controller of the work vehicle may then adjust the specific color produced by the light source of each input device so that each input device is illuminated in a color that matches the color assigned to the associated component. As an alternative operator-selected assignments, the controller may be configured to automatically provide control assignments for each controllable component, such as in applications that can include smart "plug and play" implements in which an implement communicates the specific assignments to the controller upon connection thereto.

Figure 1:
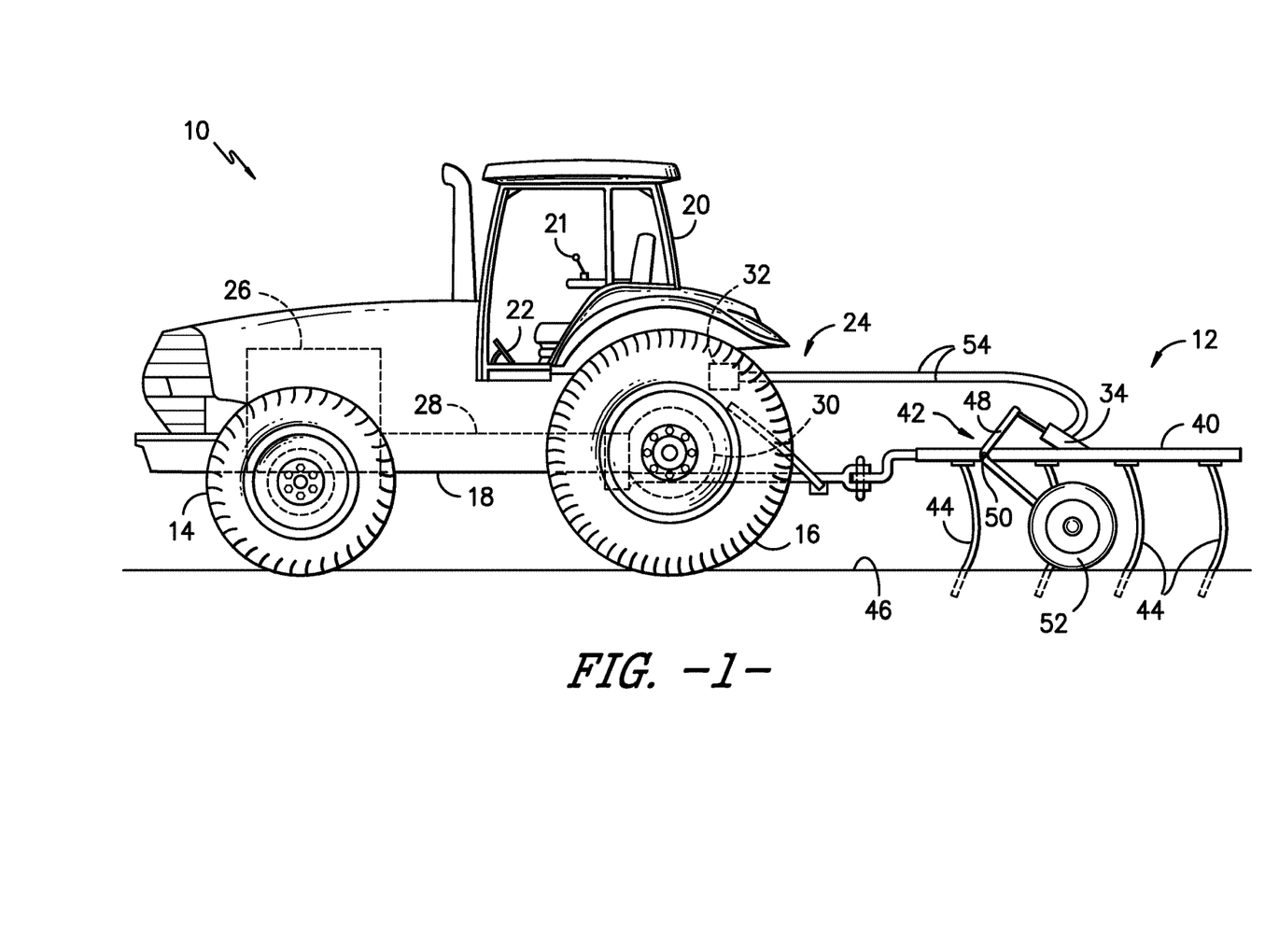
FIG. 1 illustrates a side view of one embodiment of a work vehicle towing an implement in accordance with aspects of the present subject matter.

Referring now to FIG. 1, a side view of one embodiment of a work vehicle 10 towing an implement 12 is illustrated in accordance with aspects of the present subject matter. As shown, the work vehicle 10 is configured as an agricultural tractor. However, in other embodiments, the work vehicle 10 may be configured as any other suitable work vehicle known in the art, such as any other suitable agricultural vehicle, any construction vehicle and/or the like.

As shown in FIG. 1, the work vehicle 10 includes a pair of front wheels (and associated front tires 14), a pair or rear wheels (and associated rear tires 16) and a frame or chassis 18 coupled to and supported by, the wheels. However, in other embodiments, the work vehicle 10 may include two or more pairs of front tires 14 and/or two or more pairs of rear tires 16, such as in the case of a dual or triple tire configuration. An operator's cab 20 may be supported by a portion of the chassis 18 and may house various input devices 21, 22 for permitting an operator to control the operation of one or more components of the work vehicle 10 and/or one or more components of the implement 12. For instance, as will be described below with reference to FIGS. 2-5, a plurality of input devices 100 (e.g., switch paddles) may be provided within the cab 20 for controlling the operation of corresponding valves of a hydraulic system 24 of the work vehicle 10. Additionally, the work vehicle 10 may include an engine 26 and a transmission 28 mounted on the chassis 18. The transmission 28 may be operably coupled to the engine 26 and may provide variably adjusted gear ratios for transferring engine power to the wheels via a drive axle assembly 30 (or via axles if multiple drive axles are employed).

The work vehicle 10 may also include one or more auxiliary systems coupled to the engine 26. For example, as indicated above, the work vehicle 10 may include a hydraulic system 24 that serves to provide a source of pressurized hydraulic fluid for powering various hydraulic components of the work vehicle 10, including any actuators used for driving and/or positioning the implement 12 and/or other detachable equipment of the work vehicle 10. In general, the hydraulic system 24 may include a plurality of electronically controlled valves 32. For instance, as shown in the illustrated embodiment, the hydraulic system 24 may include one or more valves 32 (e.g., electro-hydraulic remote (EHR) valves) for controlling the flow of hydraulic fluid to one or more actuators 34 associated with the implement 12. It should be appreciated that, although the valves 32 of the hydraulic system 24 are only shown in FIG. 1 as being located at the rear of the work vehicle 10, the hydraulic 24 system may generally include valves 32 positioned at any suitable location on and/or within the work vehicle 10, such as at the front of the vehicle 10.

As shown in FIG. 1, the implement 12 may generally include a frame 40 and an implement suspension system 42 configured to raise and lower the frame 40 (and/or any other suitable components of the implement 12, such as grounding engaging components 44 of the implement 12) relative to a driving surface 46 of the work vehicle 10. In several embodiments, the implement suspension system 42 may include a suspension bar 48 pivotally coupled to the frame 40 at a pivot point 50, with the suspension bar 48 being coupled to one or more wheels 52 of the implement 12 at one end and one or more implement cylinders or actuators 34 at the opposed end. As such, by extending retracting the actuators 34, the suspension bar 48 may be pivoted counterclockwise or clockwise relative to the frame 40 about the pivot point 50, thereby adjusting the position of the frame 40 relative to the driving surface 46.

Additionally, as shown in FIG. 1, the actuators 34 may be fluidly coupled to the valve(s) 32 of the hydraulic system 24 by one or more hoses 54, thereby allowing the supply of hydraulic fluid to the actuators 34 to be controlled by the valve(s) 32. In such an embodiment, the operation of the valve(s) 32 may be controlled (e.g., based on operator inputs or control signals generated by the disclosed system) to allow the frame 40 to be automatically raised and lowered relative to the driving surface 46.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 26, transmission 28, and drive axle assembly 30 are coupled, a configuration common in smaller tractors. Still other configurations may use an articulated chassis to steer the work vehicle 10, or rely on tracks in lieu of the tires 12, 14. For instance, the work vehicle 10 may correspond to a "fully tracked" work vehicle having tracks in lieu of both of its front and rear wheels or a "half-tracked" work vehicle having tracks in lieu of its front wheels or its rear wheels.

Similarly, it should also be appreciated that the configuration of the implement 12 described above and shown in FIG. 1 is only provided for exemplary purposes. Thus, it should be appreciated that the present subject matter may be readily adaptable to any manner of implement configuration. For example, the valves 32 of the hydraulic system 24 may be configured to regulate the flow of hydraulic fluid to control the operation of hydraulic components of any other suitable implement configured for use with the work vehicle 10.

Figure 2:
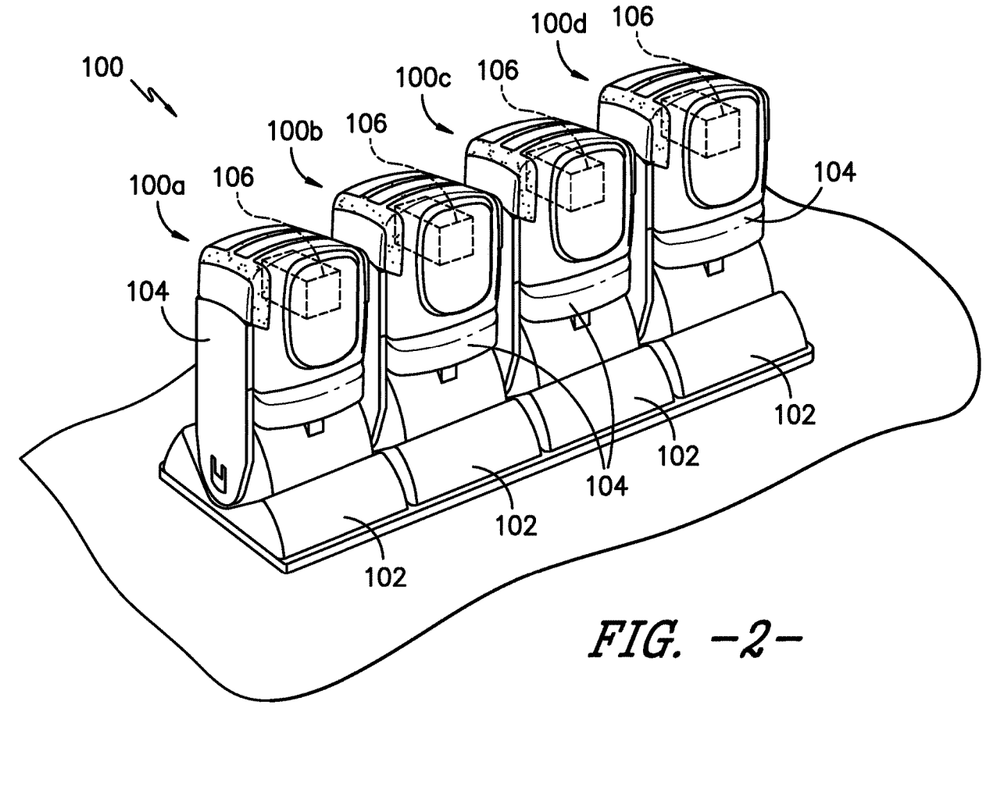
FIG. 2 illustrates a perspective view of one embodiment of a plurality of reconfigurable input devices in accordance with aspects of the present subject matter.
Figure 3:
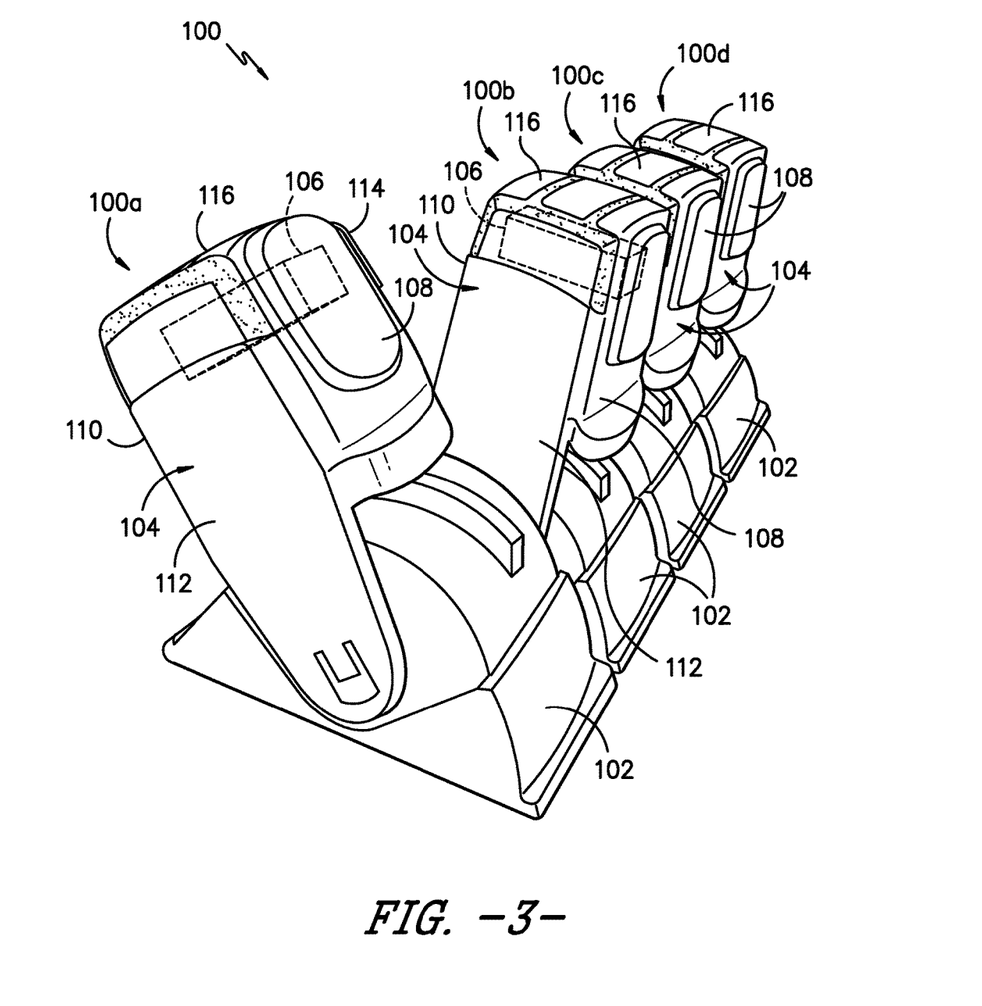
FIG. 3 illustrates an end or side view of the reconfigurable input devices shown in FIG. 2, particularly illustrating one of the input devices moved from its neutral position.
Figure 4:
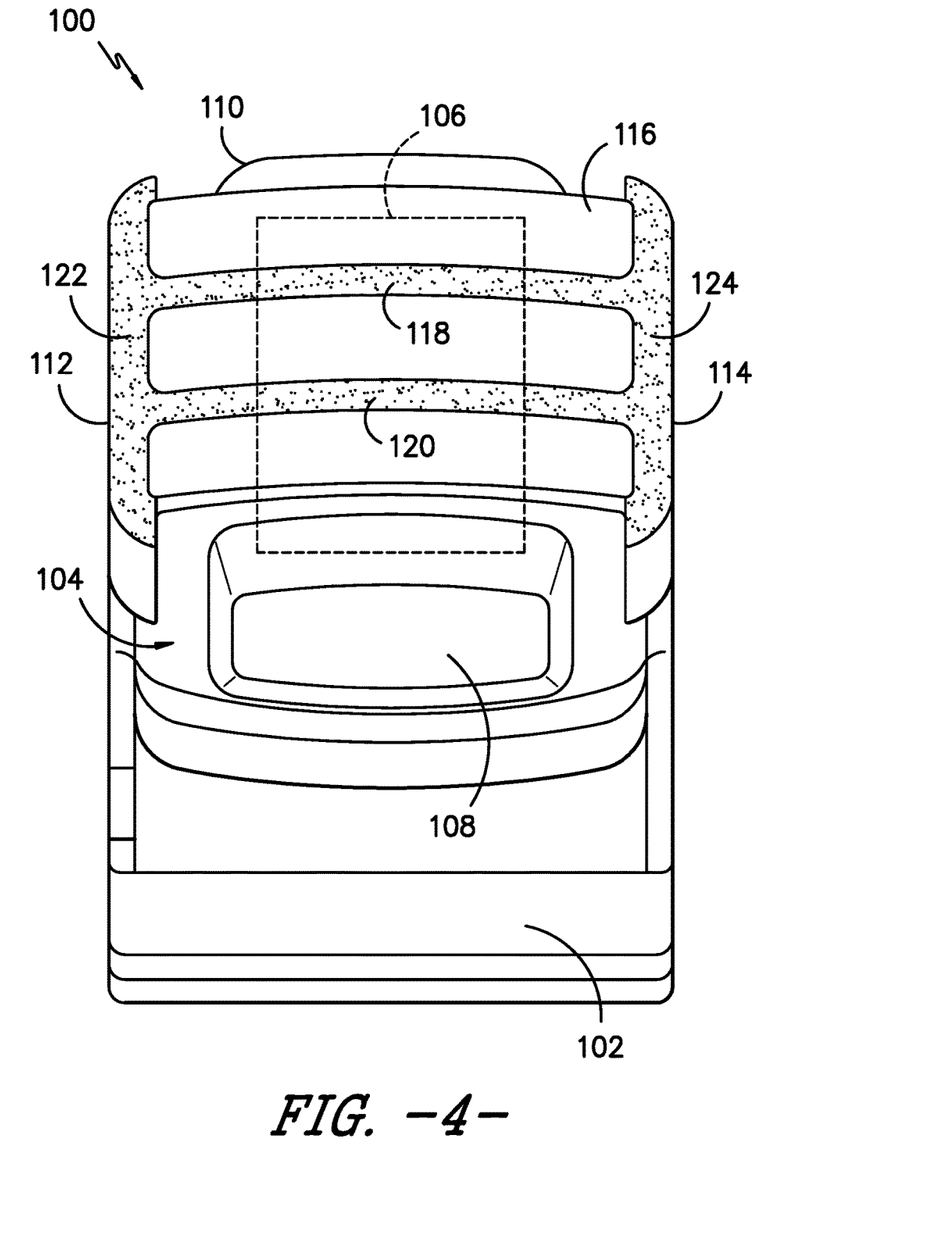
FIG. 4 illustrates a top view of one of the reconfigurable input devices shown in FIG. 2.
Figure 5:
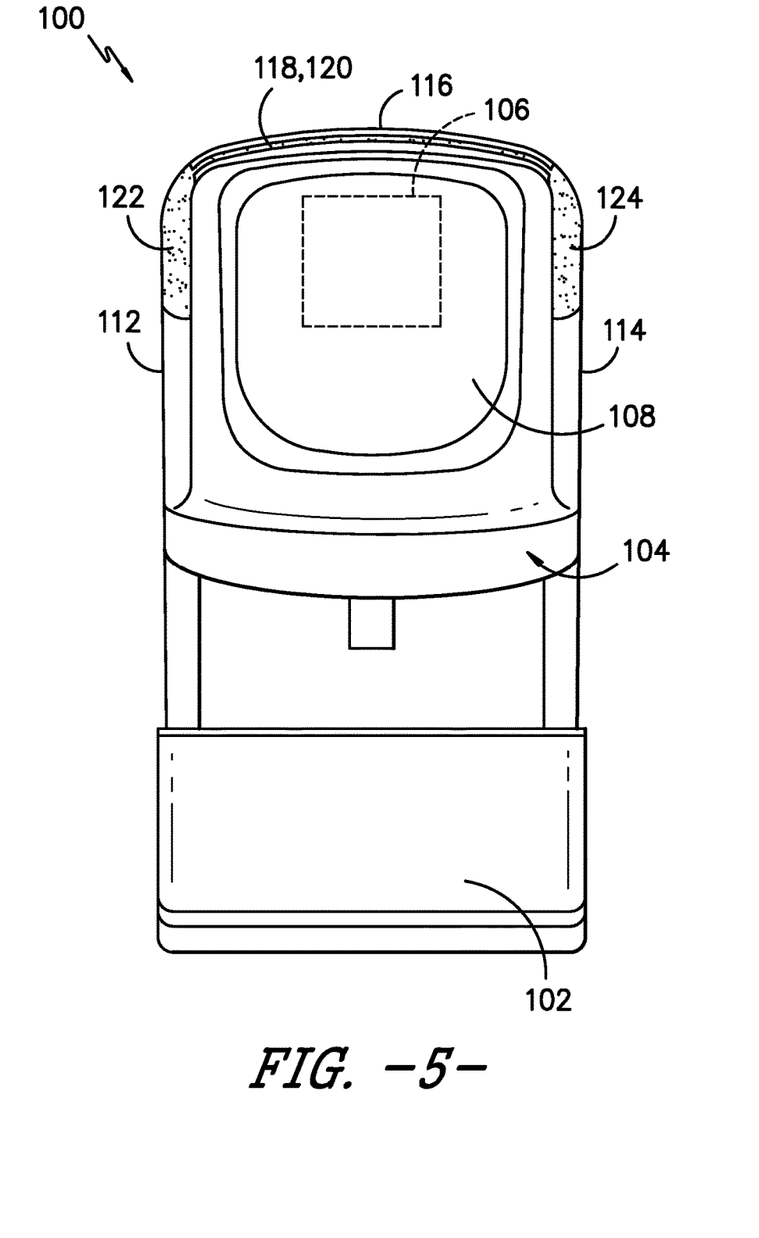
FIG. 5 illustrates a front view of one of the reconfigurable input devices shown in FIG. 2.

Referring now to FIGS. 2-5, various views of one embodiment of reconfigurable input devices 100 suitable for use with a work vehicle (e.g., the work vehicle 10 shown in FIG. 1) are illustrated in accordance with aspects of the present subject matter. Specifically, FIG. 2 illustrates a perspective view of a plurality of reconfigurable input devices 100 located side-by-side within an operator's cab 18 of a work vehicle 10. FIG. 3 illustrates an end or side view of the input devices 100 shown in FIG. 2, particularly illustrating one of the input devices 100 moved from its neutral position. Additionally, FIGS. 4 and 5 illustrate top and front views, respectively, of one of the input devices 100 shown in FIG. 2.

As particularly illustrated in FIG. 2, the work vehicle 10 is shown as including a bank of four reconfigurable input devices 100 (e.g., a first input device 100a, a second input device 100b, a third input device 100c, and a fourth input device 100d, with the various input devices 100a, 100b, 100c, 100d being referred to herein collectively or generically as the input devices 100 or the input device 100). However, in other embodiments, the work vehicle 10 may include any other suitable number of reconfigurable input devices 100, such as by including three or less reconfigurable input devices 100 or five or more reconfigurable input devices 100. Additionally, in the illustrated embodiment, each input device corresponds 100 to a paddle switch configured to be flipped up or down from a neutral position (e.g., with the neutral position being shown in FIG. 2) to allow an operator to provide an operator input to the vehicle's controller (now shown in FIGS. 2-5). However, in other embodiments, the input devices 100 may correspond to any other suitable device(s) configured to allow the operator to provide operator inputs to the controller, such as buttons, knobs, levers, slides, and/or the like. Moreover, it should be appreciated that, although the reconfigurable input devices 100 are shown as being grouped together, the disclosed input devices 100 may generally be positioned at any suitable location relative to one another. For instance, the work vehicle 100 may include a single reconfigurable input device 100 located at one position within the cab 18, multiple individual reconfigurable input devices 100 located at varying positions within the cab 18 and/or multiple banks of two or more reconfigurable input devices 100 located at varying positions within the cab 18.

As shown in the illustrated embodiment, each input device 100 may, in one embodiment, include a base 102 and a paddle housing 104 movable relative to the base 102. In general, the housing 104 may form the portion of the input device 100 configured to be manipulated by the operator. For instance, in the illustrated embodiment, the housing 104 may be configured to define a paddle-shape that allows the user to quickly and easily adjust the position of the housing 104 relative to the base 102 (e.g., by flipping the housing 104 up or down relative to the base 102) to provide operator inputs to the vehicle's controller. Specifically, as shown in FIG. 3, the housing 104 may be pivoted relative to the base 102 from its neutral position to allow a given input to be transmitted to the controller.

It should be appreciated that, although not shown, a suitable electrical connection may be provided between each input device 100 and the vehicle's controller. As such, when the operator moves the housing 104 of one of the input devices 100 relative to its corresponding base 102 to provide an operator input, a suitable signal may be transmitted from the input device 100 to the controller.

Additionally, each input device 100 may include a light source 106 configured to produce colored light in a plurality of different colors. For instance, in several embodiments, each light source 106 may correspond to a multi-color light-emitting diode (LED) device, such as a red-green-blue (RGB) LED array and/or a multi-color white LED. As is generally understood, multi-color LED devices may be adapted to produce a wide color gamut. Alternatively, each light source 106 may correspond to any other suitable light-producing device(s) that is configured to produce light of various different colors.

As shown in FIGS. 2-5, in several embodiments, each light source 106 may be configured to be housed within the housing 104 of its respective input device 100. In such an embodiment, when activated, the light source 106 may be configured to illuminate all or a portion of the housing 104 with the colored light its produces. For instance, in one embodiment, the entire housing 104 may be formed from a light transmitting material, such as transparent or a semi-transparent material polymer material. Alternatively, only selected portions of the housing 104 may be formed from a light transmitting material, with the remainder of the housing 104 being formed from an opaque material. For instance, as shown in FIGS. 3-5, each housing 104 may include a front side 108, rear side 110, a left side 112, a right side 114, and a top side 116. In such an embodiment, it may be desirable to configure each housing 100 to include one or more light transmitting portions extending along one or more of the sides 108, 110, 112, 114, 116 of the housing 104. For instance, in the illustrated embodiment, each housing 104 includes first and second upper strips 118, 120 of light transmitting material extending across the top side 116 of the housing 105 between first and second side strips 122, 124 of light transmitting material, with the first side strip 122 extending across the top of the left side 112 of the housing 104 before extending downwardly along portions of the adjacent front and rear edges of the housing 104 and the second side strip 124 extending across the top of the right side 114 of the housing 104 before extending downwardly along the adjacent front and rear edges of the housing 104. As such, when the light source 106 is activated, the colored light produced by the light source 106 may illuminate the various strips 118, 120, 122, 124 of light transmitting material in a given color along portions of each side 108, 110, 112, 114, 116 of the housing 104. Such illumination of the housing 104 along each of its exposed sides 108, 110, 112, 114, 116 may allow the operator to identify the specific color being produced by the light source 106 regardless of the position or orientation of the housing 104 relative to the operator.

It should be appreciated that, in other embodiments, each light source 106 may be provided at any other suitable location on and/or within its associated input device 100. For instance, as an alternative to be located within the housing 104 of each input device 100, the light source 106 may be provided within the base 102 of each input device 100. Alternatively, each light source 106 may be mounted to the exterior of the housing 104 and/or the base 103.

By configuring each input device 100 in the manner described herein, the light sources 106 may be used to provide visual indicators of the associated control functionality of the various input devices 100. For instance, each input device 100 may be configured to allow the operator to provide an input associated with controlling the operation of a specified, electronically controlled component, with each controllable component being assigned a unique color, in such instance, by configuring each light source 106 to produce colored light in the color assigned to the component that the associated input device 100 is configured to control, the operator may easily distinguish the input devices 100 from one another based on the different colors, thereby allowing the operator to easily and efficiently select the specific input device 100 for controlling a desired component.

For example, as will be described below with reference to FIG. 6, each input device 100 may, in several embodiments, correspond to a valve paddle configured to allow the operator to provide operator inputs for controlling the operation of a corresponding valve of a vehicle's hydraulic system (e.g., the hydraulic system 24 described above). Additionally, each valve controllable by the input devices 100 may be assigned a different color, such as by assigning a first valve of the hydraulic system the color blue and a second valve of the hydraulic system the color yellow. In such instance, the light source 106 of the input device 100 configured to control the first valve may be operated to so as to produce blue colored light while the light source 106 of the input device 100 configured to control the second valve may be operated so as to produce yellow colored light.

Moreover, given that each light source 106 may be configured to produce colored light in a variety of different colors, the disclosed input devices 100 may be quickly and easily reassigned or reconfigured to control a different component. For instance, using the example from the previous paragraph and assuming that the first input device 100a is configured to control the first valve and the second input device 100b is configured to control the second valve, the operator may desire to reconfigure the input devices 100a, 100b so that the first input device 100a is configured to control the second valve and the second input device 100b is configured to control the first valve. In such instance, the operator may provide suitable inputs to the vehicle's controller indicating the operator's preferences or selections for reconfiguring the input devices 100a, 100b. Based on such inputs, the controller may internally reconfigure the control assignments defined between each input device 100a, 100b and the controlled components to match the operator's preferences. Thereafter, the controller may then transmit a suitable control signal to the first input device 100a so as to cause the light source 106 of the first input device 100a to produce yellow colored light, thereby providing an indication that the first input device 100a is now configured to control the second valve. Similarly, the controller may transmit a suitable control signal to the second input device 100b so as to cause the light source 106 of the second input device 100b to produce yellow colored light, thereby providing an indication that the second input device 100b is now configured to control the first valve.

Figure 6:
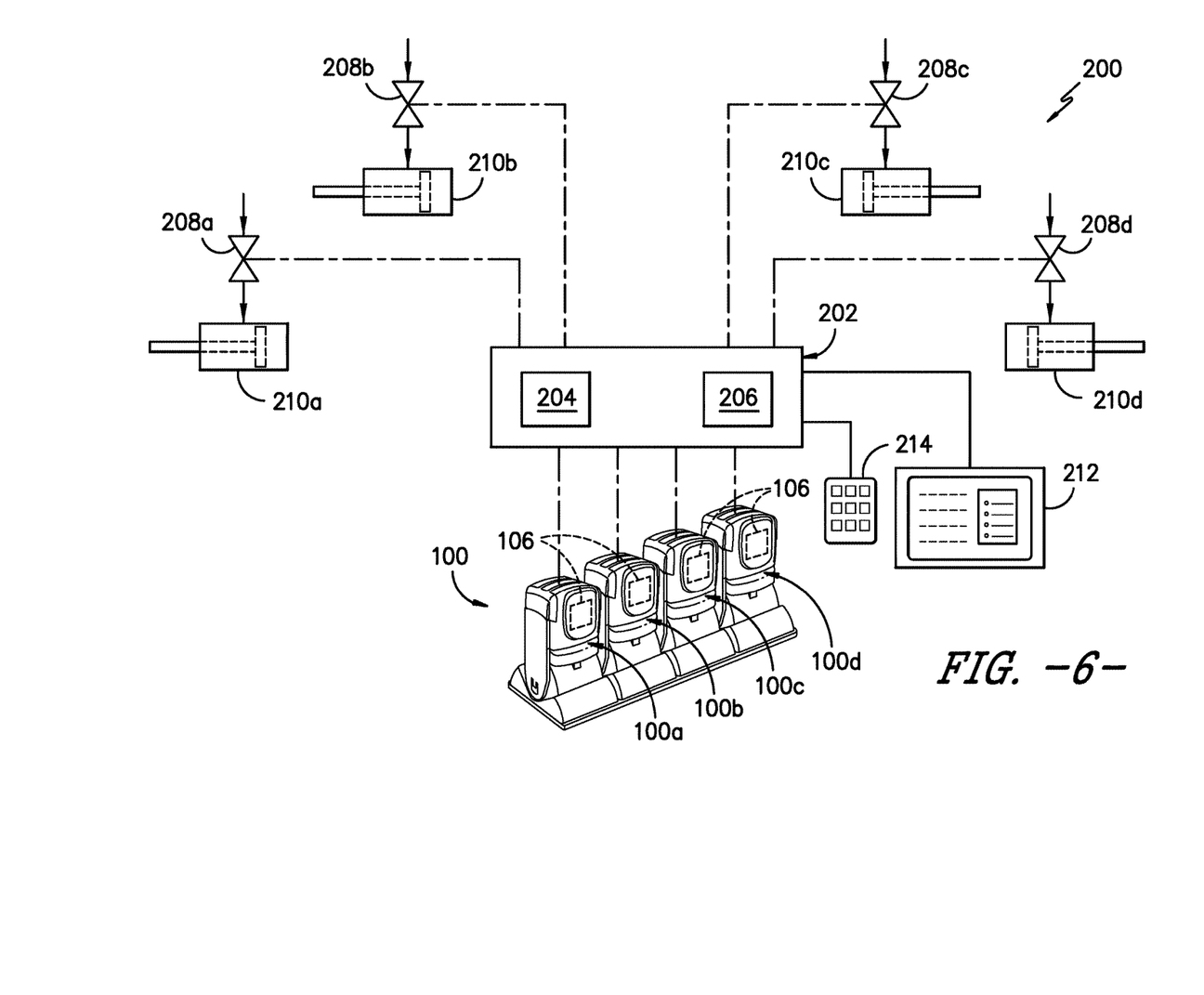
FIG. 6 illustrates a schematic view of one embodiment of a system for providing reconfigurable input devices for a work vehicle in accordance with aspects of the present subject matter.

Referring now to FIG. 6, a schematic view of one embodiment of a system 200 for providing reconfigurable input devices for a work vehicle is illustrated in accordance with aspects of the present subject matter. In general, the system 200 will be described herein with reference to the work vehicle 10 shown in FIG. 1 and the input devices 100 shown in FIGS. 2-5. However, it should be appreciated that the disclosed system 200 may generally be utilized with any suitable work vehicle and/or any suitable input devices to reassign the control functionality of such input devices for use in controlling the operation of one or more electronically controlled components.

As shown, the system 200 may include a controller 200 configured to be communicatively coupled to both a plurality of input devices 100 (e.g., the input devices 100a, 100b, 100c, 100d described above) and a corresponding set of components 208 whose operation is configured to be electronically controlled by the controller 202 based on operator inputs provided via the input devices 100. In the illustrated embodiment, the controller 200 is communicatively coupled to the input devices 100 and the controllable components 208 via wired connections. However, in other embodiments, the controller 202 may be coupled to the input devices 100 and/or the components 208 via any other suitable communicative link(s), such as a wireless connection that utilizes any suitable wireless communications protocol.

In general, the controller 202 may comprise any suitable processor-based device known in the art, such as a computing device or any suitable combination of computing devices. Thus, in several embodiments, the controller 202 may include one or more processor(s) 204 and associated memory device(s) 206 configured to perform a variety of computer-implemented functions. As used herein, the term "processor" refers not only to integrated circuits referred to in the art as being included in a computer, but also refers to a controller, a microcontroller, microcomputer, a programmable logic controller (PLC), an application specific integrated circuit, and other programmable circuits. Additionally, the memory device(s) 206 of the controller 202 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the method 300 described below with reference to FIG. 7. In addition, the controller 202 may also include various other suitable components, such as a communications circuit or module, one or more input/output channels, a data/control bus and/or the like.

It should be appreciated that the controller 202 may correspond to an existing controller of the work vehicle 10 or the controller 202 may correspond to a separate processing device. For instance, in one embodiment, the controller 202 may form all or part of a separate plug-in module that may be installed within the work vehicle 10 to allow for the disclosed system and method to be implemented without requiring additional software to be uploaded onto existing control devices of the vehicle 10.

As indicated above, the input devices 100 may be configured to allow an operator of the work vehicle 10 to provide operator inputs associated with controlling the operation of various components of the work vehicle 10 (e.g., including any components of an implement being towed by the work vehicle 10 (e.g., implement 12 shown in FIG. 1.)). For instance, the input devices 100 may be positioned within the cab 18 of the work vehicle 10 at a location accessible to the operator. In such instance, the operator may utilize each input device 100 to provide operator inputs to the controller 202 while the operator is operating the work vehicle. Based on the particular input device 100 used by the operator, the controller 202 may, in turn, control the operation of the component(s) associated with such input device 100.

In a particular embodiment of the present subject matter, the components 208 configured to be controlled by the input devices 100 may correspond to a plurality of electronically controlled valves of the hydraulic system 24 of the work vehicle 10. For instance, as shown in FIG. 6, the hydraulic system 24 may include a first valve 208a, a second valve 208b, a third valve 208c, and a fourth valve 208d, with each valve 208a, 208b, 208c, 208d being configured to control or regulate the flow of hydraulic fluid to a corresponding hydraulic component 210a, 210c, 210c, 210d (e.g., an actuator) of the work vehicle 10 or the implement 12 being towed by the work vehicle 10. in such an embodiment, each input device 100 may be associated with controlling the operation of one of the valves 208a, 208b, 208c, 208d. For example, in one embodiment, the first input device 100a may be associated with controlling the first valve 208a, with the second, third, and fourth input devices 100b, 100c, 100d being associated with controlling the second, third, and fourth valves 208b, 208c, 208d, respectively. In such an embodiment, by providing an operator input via the second input device 100b (e.g., by flipping the housing 104 of the second input device 100b up or down relative to its base 102), the controller 202 may be configured to control the operation of the second valve 208b in a manner that adjusts the supply of hydraulic fluid to the corresponding hydraulic component 210b (e.g., by cutting on or off the supply of hydraulic fluid to the component 210b).

In several embodiments, the controller 202 may be configured to store the assignment data within its memory 206 that correlates each input device 100 to a corresponding controllable component 208. For instance, the controller 202 may include a look-up table or other suitable database that correlates each input device 100 to the specific component (s) 208 that it is configured to control. Additionally, the look-up table or other suitable database may also correlate each controllable component 208 a specific color assignment. For instance, in the embodiment shown in FIG. 6, the first valve 208a may be assigned the color blue, the second valve 208b may be assigned the color yellow, the third valve 208c may be assigned the color green, and the fourth valve 208d may be assigned the color red. Thus, for each valve 208a, 208b, 208c, 208d configured to be controlled via inputs provided by one of the input devices 100, both the color assignment and the input device assignment may be stored within the memory 206 of the controller 202. An example table (e.g., Table 1) showing the stored color and input device assignments for each valve 208a, 208b, 208c, 208d is provided below.

TABLE 1

Example color and input device assignments

| Valve | Color Assignment | Input Device Assignment |
| --- | --- | --- |
| First Valve | Blue | First Input Device |
| Second Valve | Yellow | Second Input Device |
| Third Valve | Green | Third Input Device |
| Fourth Valve | Red | Fourth Input Device |

By storing the assignment data for each valve 208a, 208b, 208c, 208d, the controller 202 may be configured to control the light source 106 associated with each input device 100 so that the various input devices 100a, 100b, 100c, 100d are illuminated based on the corresponding color assignment. For instance, using the example color and input device assignments provided above in Table 1, the controller 202 may be configured to transmit suitable control signals to cause the light source 106 associated with the first input device 100a to produce blue colored light and the light source 106 associated with the second input device 100b to produce yellow colored light, thereby providing a visual indication to the operator that the first and second input devices 100a, 100b are configured to control the first and second valves 208a, 208b, respectively. Similarly, the controller 202 may be configured to transmit suitable control signals to cause the light source 106 associated with the third input device 100c to produce green colored light and the light source 106 associated with the fourth input device 100d to produce red colored light, thereby providing a visual indication to the operator that the third and fourth input devices 100c, 100d are configured to control the third and fourth valves 208c, 208d, respectively.

In addition, the controller 202 may also be configured to adjust the input device assignments for the various controllable components 208 based on inputs provided by the operator. For example, given the positioning of the input devices 100 within the cab 18 relative to the operator and/or the frequency of use of each input device 100, the operator may prefer that the first input device 100a be used to control the operation of the third valve 208c and the third input device 100c be used to control the operation of the first valve 208a, with the second and fourth input devices 100b, 100d being maintained for use in controlling the operation of the second and fourth valves 208b, 208d, respectively. In such instance, the operator may instruct the controller 202 to reassign the relevant input devices 100a, 100c so that each valve 208a, 208c is matched to the desired input device. The controller 202 may then adjust the input device assignments stored within its memory 206 for the various valves, as necessary, to match the operator-selected preferences. An example table (e.g., Table 2) showing the color and input device assignments for each valve 208a, 208b, 208c, 208d following the reassignment described above is provided below.

TABLE 2

Example color and input device assignments following reassignment

| Valve | Color Assignment | Input Device Assignment |
| --- | --- | --- |
| First Valve | Blue | Third Input Device |
| Second Valve | Yellow | Second Input Device |
| Third Valve | Green | First Input Device |
| Fourth Valve | Red | Fourth Input Device |

Based on the operator-selected assignments, the controller 202 may then transmit suitable control signals to control the light source 106 associated with each input device 100 so that the various input devices 100a, 100b, 100c 100d are illuminated in accordance with the operator's preferences. For instance, by adjusting the input device assignment for the first valve 208a from the first input device 100a to the third input device 100c, the controller 202 may be configured to cause the light source 106 associated with the third input device 100c to produce blue colored light as opposed to green colored light, thereby providing a visual indication that the third input device 100c is now configured to control the first valve 208a as opposed to the third valve 208b. Similarly, by adjusting the input device assignment for the third valve 208c from the third input device 100c to the first input device 100a, the controller 202 may be configured to cause the light source 106 associated with the first input device 100a to produce green colored light as opposed to blue colored light, thereby providing a visual indication that the first input device 100a is now configured to control the third valve 208c as opposed to the first valve 208a. Additionally, in the example provided above in Table 2, since the operator did not reconfigure the input device assignments for the second and fourth valves 208b, 208d, the controller 202 may continue to cause the lights sources 106 for the second and fourth input devices 100b, 100d to produce the same colored light as previously assigned (e.g., yellow for the second input device 100b and red for the fourth input device 100d).

It should be appreciated that, in addition to being able to adjust the input device assignments for each valve 208a, 208b, 208c 208d, the operator may be also be allowed to adjust the color assignments for the valves 208a, 208b, 208c 208d. For instance, in the event that the operator prefers a particular color to be associated with a given valve, the operator may instruct the controller 202 to adjust the color assignment for such valve to a particular operator-selected color. Thereafter, the controller 202 may transmit suitable control signals to the light source 106 of the relevant input device 100 so that the light source 106 produces colored light in the new operator-selected color.

It should also be appreciated that the operator may be configured to view the various forms of assignment data stored within the controller's memory 206, as well as provide inputs for changing the assignment data, via any suitable means. For instance, as shown in FIG. 6, the controller 202 may, in one embodiment, be communicatively coupled to a display device 212. (e.g., mounted within the operator's cab 18) that may be configured to display the assignment data for each valve 208a, 208b, 208c 208d. In such an embodiment, the operator may navigate through a user interface presented on the display device 212 to allow the color and input device assignment date for the valves 208a, 208b, 208c 208d to be displayed on the device 212. Moreover, in one embodiment, the display device 212 may include a touch screen for providing operator inputs. As such, the operator may provide inputs for adjusting the color and/or input device assignments for the valves 208a, 208b, 208c 208d by simply touching the display device 212. Alternatively, a separate input device(s) 214, such as a keypad, buttons, and/or the like, may be communicatively coupled to the controller 202 to allow the operator to provide suitable inputs for changing the assignment data.

Additionally, in several embodiments, the controller 202 may be configured to apply suitable machine learning techniques to allow the controller 202 to learn the operator's desired preferences in relation to the assignment data. For instance, the controller 202 may predict certain color and/or input device assignments to be applied based on previous adjustments made by the operator during particular operating scenarios, such as specific adjustments made for a given operating mode of the work vehicle 10, specific adjustments made for the particular implement 12 being towed by the work vehicle 10, specific adjustments made for the current season or time or day and/or the like.

It should be appreciated that the valves 208a, 208b, 208c 208d shown in FIG. 6 are simply provided as examples of suitable components that may be electronically controlled by the controller 202 based on inputs received from the input devices 100. However, in other embodiments, the system 200 may include any other suitable components configured to be controlled by the controller 202 based on inputs received from corresponding input devices. Additionally, it should be appreciated that the example color assignments described above for the various controllable components 208 are simply provided for the purpose of describing a particular embodiment of the present subject matter. In general, any suitable color may be assigned to each controllable component 208, with the range of colors being limited primarily by the color producing capabilities of the associated light sources 106.

Figure 7:
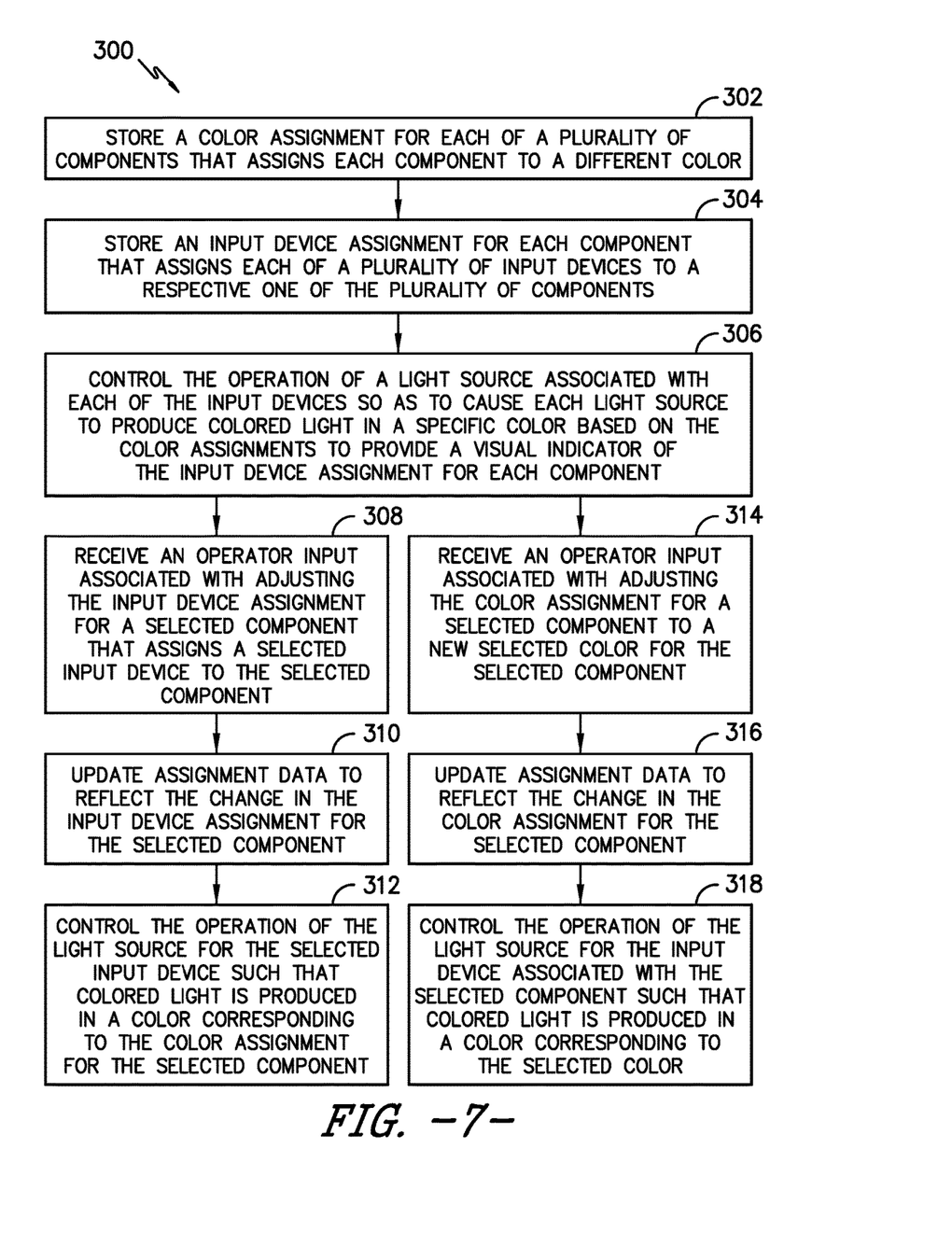
FIG. 7 illustrates a flow diagram of one embodiment of a method for providing reconfigurable input devices for a work vehicle in accordance with aspects of the present subject matter.

Referring now to FIG. 7, a flow diagram of one embodiment of a method 300 for providing reconfigurable input devices for a work vehicle is illustrated in accordance with aspects of the present subject matter. In general, the method 300 will he described herein with reference to the embodiments of the work vehicle 10, the input devices 100, and the system 200 described above with reference to FIGS. 1-6. However, it should be appreciated by those of ordinary skill in the art that the disclosed method 300 may be implemented with any work vehicle having any other suitable vehicle configuration and any input device having any other suitable input device configuration, as well as with any other system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

In several embodiments, the disclose method 300 may be utilized with a work vehicle that includes a plurality of input devices configured to receive operator inputs associated with controlling the operation of a plurality of different components. As shown in FIG. 7, at (302), the method 300 may include storing a color assignment for each of the plurality of components that assigns each component to a different color. In addition, at (304), the method 300 may include storing an input device assignment for each of the plurality of components that assigns each of the plurality of input devices to a respective one of the plurality of components.

For example, as indicated above, the controller 202 may be configured to store both color assignments and input device assignments within its memory 206 for each of the controllable components 208.

Moreover, at (306), the method 300 may include controlling the operation of a light source associated with each of the plurality of input devices so as to cause each light source to produce colored light in a specific color based on the color assignments so as to provide a visual indicator of the input device assignment for each of the plurality of components. Specifically, as indicated above, the controller 202 may be configured to transmit suitable control signals to each light source 106 that causes the light source 106 to produce colored light in a color that matches the color assignment for the corresponding controllable component 208. Thus, the specific color illuminating from each input device 100 may provide the operator with a visual indicator of the specific component 208 that such input device 100 is configured to control.

Further, the method 300 may also include various other method elements or control steps. For instance, as indicated above, the operator may be allowed to adjust the input device assignment for one or more of the controllable components 208. In such instance, the method may, at (308), include receiving an input from the operator that is associated with adjusting the input device assignment for a selected component 208 such that a selected input device 100 is assigned to the selected component 208. Thereafter, the controller 202 may, at (310), update the assignment data stored within the controller's memory 206 to reflect the change in the input device assignment for the selected component 208. The controller 202 may then, at (312), control the operation of the light source 106 associated with selected input device 100 such that the light source 106 produces colored light in a color corresponding to the color assignment for the selected component.

Additionally, as indicated above, the operator may also be allowed to adjust the color assignment for one or more of the controllable components 208. In such instance, the method 300 may include, at (314), receiving an input from the operator that is associated with adjusting the color assignment for a selected component 208 such that a selected color is now assigned to the selected component 208. Thereafter, the controller 202 may, at (316), update the assignment data stored within the controller's memory 206 to reflect the change in the color assignment for the selected component 208. The controller 202 may then, at (318), control the operation of the light source 106 associated with the input device 100 configured to control the operation of the selected component 208 such that the light source 106 produces colored light in a color corresponding to the selected color.

This written description uses examples to disclose the invention, including the best mode, and also to enable any person skilled in the art to practice the invention, including making and using any devices or systems and performing any incorporated methods. The patentable scope of the invention is defined by, the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for providing reconfigurable input devices for a work vehicle, the system comprising:
a plurality of input devices configured to receive operator inputs associated with controlling the operation of a plurality of components, each input device including a light source;
a controller communicatively coupled to the plurality of input devices, the controller being configured to store an input device assignment for each of the plurality of components that assigns each input device to a respective one of the plurality of components, the controller being further configured to transmit a control signal to each input device that causes the light source of each input device to produce colored light,
wherein a specific color of the colored light produced by the light source of each input device provides a visual indicator of the input device assignment for each of the plurality of components.

2. The system of claim 1, wherein the controller is configured to adjust the input device assignment for one or more of the plurality of components based on inputs provided by the operator.

3. The system of claim 1, wherein the controller stores a color assignment for each component of the plurality of components that assigns each component to a different color, the controller being configured to cause the light source of each input device to produce colored light in a color that matches the color of the component to which the input device is assigned.

4. The system of claim 3, wherein the controller is configured to adjust the color assignment for one or more of the plurality of components based on inputs provided by the operator.

5. The system of claim 1, wherein each input device corresponds to a paddle switch.

6. The system of claim 1, wherein each input device includes a housing configured to house the light source, wherein the light source is configured to illuminate at least a portion of the housing with the colored light to provide the visual indicator.

7. The system of claim 6, wherein the at least a portion of the housing corresponds to at least one band of light transmitting material extending along at least one side of the housing.

8. The system of claim 1, wherein the light source for each of the plurality of input devices corresponds to a multi-color light-emitting diode device.

9. The system of claim 1, wherein each of the plurality of components corresponds to an electronically controlled valve.

10. A system for providing reconfigurable input devices for controlling the operation of valves of a hydraulic system of a work vehicle, the system comprising:
a plurality of electronically controlled valves;
a plurality of input devices configured to receive operator inputs associated with controlling the operation of the plurality of valves, each input device including a light source;
a controller communicatively coupled to the plurality of input devices and the plurality of valves, the controller being configured to store an input device assignment for each of the plurality of valves that assigns each input device to a respective valve of the plurality of valves, the controller being further configured to transmit a control signal to each input device that causes the light source of each input device to produce colored light, wherein a specific color of the colored light produced by the light source of each input device provides a visual indicator of the input device assignment for each of the plurality of valves.

11. The system of claim 10, wherein the controller is configured to adjust the input device assignment for one or more of the plurality of valves based on inputs provided by the operator.

12. The system of claim 10, wherein the controller stores a color assignment for each valve of the plurality of valves that assigns each valve a different color, the controller being configured to cause the light source of each input device to produce colored light in a color that matches the color of the valve to which the input device is assigned.

13. The system of claim 12, wherein the controller is configured to adjust the color assignment for one or more of the plurality of valves based on inputs provided by the operator.

14. A method for providing reconfigurable input devices for a work vehicle, the work vehicle including a plurality of input devices configured to receive operator inputs associated with controlling the operation of a plurality of components, the method comprising:
storing, with a computing device, a color assignment for each of the plurality of components that assigns each component to a different color;
storing, with the computing device, an input device assignment for each of the plurality of components that assigns each of the plurality of input devices to a respective one of the plurality of components; and
controlling, with the computing device, the operation of a light source associated with each of the plurality of input devices so as to cause each light source to produce colored light in a specific color based on the color assignments so as to provide a visual indicator of the input device assignment for each of the plurality of components.

15. The method of claim 14, further comprising:
receiving an operator input associated with adjusting the input device assignment for a selected component of the plurality of components such that a selected input device of the plurality of input devices is now assigned to the selected component; and
updating the stored input device assignment to reflect the change made for the selected component.

16. The method of claim 15, further comprising controlling the operation of the light source associated with selected input device such that the light source produces colored light in a color corresponding to the color assignment for the selected component.

17. The method of claim 14, further comprising:
receiving an operator input associated with adjusting the color assignment for a selected component of the plurality of components such that a selected color is now assigned to the selected component; and
updating the stored color assignment to reflect the change made for the selected component.

18. The method of claim 17, further comprising controlling the operation of the light source associated with input device configured to receive operator inputs for controlling the operation of the selected component such that the light source produces colored light in a color corresponding to the selected color.

19. The method of claim 14, wherein the light source for each of the plurality of input devices corresponds to a multi-color light-emitting diode device.

20. The method of claim 14, wherein each of the plurality of components corresponds to an electronically controlled valve.

* * * * *